United States Patent
Arendsen

(10) Patent No.: US 11,503,803 B2
(45) Date of Patent: Nov. 22, 2022

(54) PET RETRIEVAL DEVICE

(71) Applicant: Sandra Arendsen, Newaygo, MI (US)

(72) Inventor: Sandra Arendsen, Newaygo, MI (US)

( * ) Notice: Subject to any disclaimer, the term of this patent is extended or adjusted under 35 U.S.C. 154(b) by 0 days.

(21) Appl. No.: 17/216,679

(22) Filed: Mar. 30, 2021

(65) Prior Publication Data

US 2022/0312729 A1   Oct. 6, 2022

(51) Int. Cl.
  *A01K 11/00*   (2006.01)
  *G01S 19/34*   (2010.01)
  *G01S 19/14*   (2010.01)

(52) U.S. Cl.
  CPC ............ *A01K 11/008* (2013.01); *G01S 19/14* (2013.01); *G01S 19/34* (2013.01)

(58) Field of Classification Search
  CPC ........ A01K 11/008; G01S 19/14; G01S 19/34
  See application file for complete search history.

(56) References Cited

U.S. PATENT DOCUMENTS

| | | |
|---|---|---|
| 7,102,508 B2 | 9/2006 | Edelstein et al. |
| 7,589,638 B2 | 9/2009 | Jackson et al. |
| 8,288,869 B2 | 10/2012 | Huang et al. |
| 9,055,733 B2 | 6/2015 | Jones, II |
| 10,292,364 B2 | 5/2019 | Barton et al. |
| 10,342,219 B2 | 7/2019 | Deliou et al. |
| 10,420,325 B2 | 9/2019 | Czarnecky et al. |
| 2020/0396962 A1* | 12/2020 | Wallace ............... A61D 17/002 |

* cited by examiner

*Primary Examiner* — Hongmin Fan

(57) ABSTRACT

An illustrated view of an exemplary first pet location device and an illustrated view of a second embodiment of a second pet location device for locating lost or stolen pets is presented. The pet location devices are useful for providing worldwide tracking of a pet. Further, along with pets, the pet location devices could be modified to work with handicapped children and adult to track their location. The pet location devices are preferably inserted and removed only by a licensed Veterinarian.

10 Claims, 5 Drawing Sheets

PET RETRIEVAL DEVICE

FIELD OF THE INVENTION

This invention relates to lost pets. More particularly, it relates to a device for locating lost pets.

BACKGROUND

A pet, or companion animal, is an animal kept primarily for a person's company or entertainment rather than as a working animal, livestock or a laboratory animal. Popular pets are often considered to have attractive appearances, intelligence and relatable personalities, but some pets may be taken in on an altruistic basis (such as a stray animal) and accepted by the owner regardless of these characteristics. Two of the most popular pets are dogs and cats; the technical term fora cat lover is an ailurophile and a dog lover a cynophile.

Pets provide their owners (or "guardians") both physical and emotional benefits. Walking a dog can provide both the human and the dog with exercise, fresh air and social interaction. Pets can give companionship to people who are living alone or elderly adults who do not have adequate social interaction with other people. There is a medically approved class of therapy animals, mostly dogs or cats, that are brought to visit confined humans, such as children in hospitals or elders in nursing homes. Pet therapy utilizes trained animals and handlers to achieve specific physical, social, cognitive or emotional goals with patients.

People most commonly get pets for companionship, to protect a home or property or because of the perceived beauty or attractiveness of the animals. A 1994 Canadian study found that the most common reasons for not owning a pet were lack of ability to care for the pet when traveling (34.6%), lack of time (28.6%) and lack of suitable housing (28.3%), with dislike of pets being less common (19.6%). Some scholars, ethicists and animal rights organizations have raised concerns over keeping pets because of the lack of autonomy and the objectification of non-human animals.

Pets are descendants of wild animals of their species. At times, an owner or caretaker of the pet will allow the pet to roam in the outdoors to use the restroom, feel freedom as their ancestors had, etc. Although this is well-intentioned, pets sometimes escape for leashes or can find their way around, under or through fences. At other times, the pets may be stolen as some pets are monetarily valuable. There is currently no good way to track a pet other than insertion of a Global Positioning System device under the skin of the pet, which is costly and is seldom removed from the pet even after the battery has expired or the device is no longer in working order. The loss of a pet can be devastating on a person and/or family. The pets have become a family member taking their position along with the parents and children of the household.

Accordingly, and in light of the foregoing, there is a desire for a device that can be inserted into the skin of an animal and can register with a device for tracking of an owner. There is also a desire for the device to have a Global Positioning System (GPS) device and a wireless connectivity to an app on a smartphone, computer and the like.

DETAILED DESCRIPTION

Figure 1A:
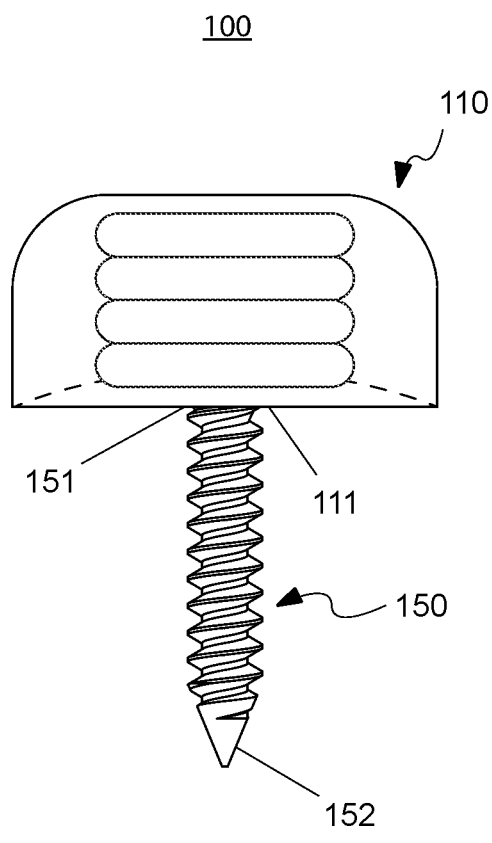
FIG. 1A is an illustrated view of an exemplary pet location device.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1B:
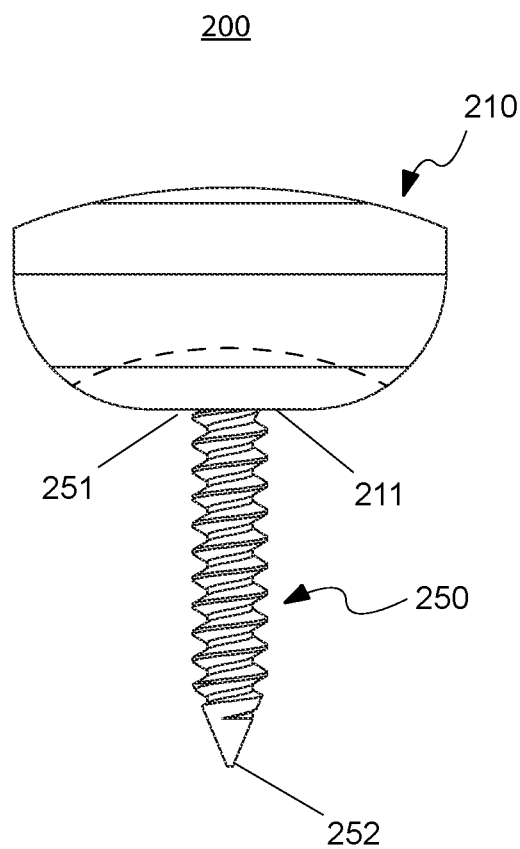
FIG. 1B is an illustrated view of a second embodiment of a pet location device.

Referring to FIG. 1A and FIG. 1B, FIG. 1A is an illustrated view of an exemplary first pet location device 100 and FIG. 1B is an illustrated view of a second embodiment of a second pet location device 200 for locating lost or stolen pets is presented. The pet location devices 100, 200 are useful for providing worldwide tracking of a pet. Further, along with pets, the pet location devices 100, 200 could be modified to work with handicapped children and adults to track their location. The pet location devices 100, 200 are preferably inserted and removed only by a licensed Veterinarian.

Although the pet location devices 100, 200 are different embodiments, similarities will be described for both the pet location devices 100, 200. The first pet location device 100 is preferably a semi-circular shape, however other shapes are hereby contemplated, including, but not limited to, star, rectangular, square, oval, etc. The second pet location device 200 is preferably a circular shape, however other shapes are hereby contemplated, including, but not limited to, semi-circular, star, rectangular, square, oval, etc.

Each of the pet location devices 100, 200 have a gem 110, 210 and a connector 150, 250. The gem 110, 210 will be described in FIGS. 2A and 2B. The connector 150, 250 is preferably a screw connector, however, other types of connectors are hereby contemplated, including, but not limited to, earring, a Velcro® fastener, two-sided tape, tie straps, etc. Each of the connectors 150, 250 have a top 151, 251 and a bottom 152, 252.

The bottom 152, 252 of the connectors 150, 250 is preferably point shaped, however, other shapes are hereby contemplated, including, but not limited to, flat, hexagonal, square, etc. The connectors 150, 250 preferably made of a titanium material, however other types of material are hereby contemplated, including, but not limited to, plastic, aluminum, steel, etc. In FIG. 1A, the top 251 of the connector 250 is coupled to the bottom 111 of the gem 110 and in FIG. 1B the top 251 of the connector 250 is securely coupled to a bottom 211 of the gem 210.

Figure 2A:
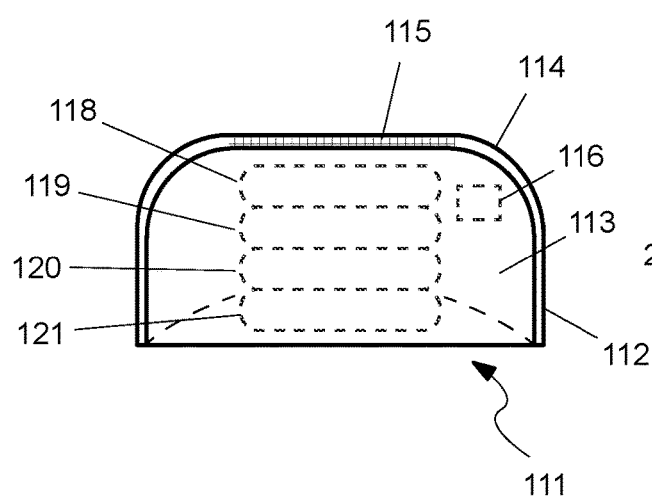
FIG. 2A is an illustrated detailed view of the exemplary pet location device as shown in FIG. 1A.
Figure 2B:
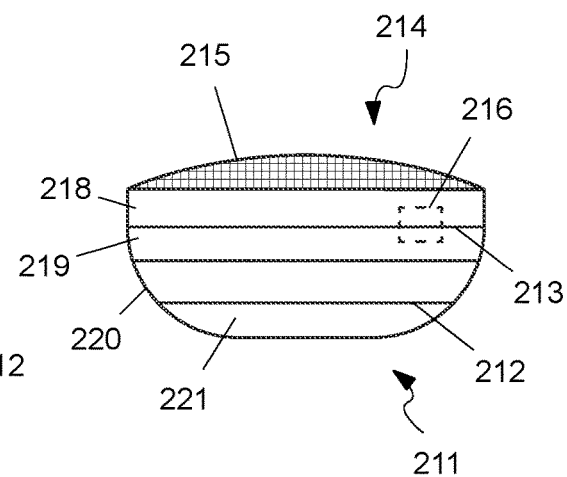
FIG. 2B is an illustrated detailed view of the second embodiment of a pet location device as shown in FIG. 1B.

Moving now to FIG. 2A and FIG. 2B, FIG. 2A illustrated detailed views of the gem 110 as shown in FIG. 1A and the second embodiment of the gem 210 as shown in FIG. 1B are presented. Like parts or pieces or actions of the first and second gems 110, 210 will be described in a single entry of this application but it should be noted that each of the first and second gems 110, 210 are identical except where noted.

In FIG. 1A, the first gem 110 has an outside 112, an inside 113, 213, a top 114 and the bottom 111. In FIG. 1B, the bottom 111 is preferably flat, so as to lay flat when in use. The second gem 210 has an outside 212, an inside 213, a top 214 and the bottom 211. The bottom 211 is preferably flat, so as to lay flat when in use.

The first and second gem 110, 210 are preferably made of a shatterproof glass material, however other types of material is hereby contemplated, including, but not limited to, glass, plastic, etc.

A solar panel 115, 215 is coupled to the top 114, 214. The solar panel 115, 215 for capturing the energy produced by the sun and is coupled to a battery 116, 216 to store the converted energy.

A GPS chip 118, 218 is coupled to the inside 113, 213 of the gem 110, 210. The GPS chip 118, 218 communicates with satellites to receive GPS coordinate information. The GPS chip 118, 218 is electrically coupled to the battery 116, 216.

A wireless communications chip 119, 219 is electrically coupled to the battery 116, 216. The wireless communications chip 119, 219 is communicatively coupled to external devices by a signaling protocol 300, see FIG. 4B. The signaling protocol 300 is preferably consistent with the IEEE 802.11 (WiFi®) standards, however other types of signaling protocols are hereby contemplated, including, but not limited to, 5G, 3GPP2, IEEE 802.15 (Bluetooth®), etc.

A computing device 120, 220 is coupled to the inside 113, 213 of the gem 110, 210. The computing device 120, 220 is electrically coupled to the battery 116, 216. Further, the computing device 120, 220 is communicatively coupled to the GPS chip 118, 218 and receives GPS coordinate information via the GPS chip 118, 218. The computing device 120, 220 is communicatively coupled to the wireless communications chip 119, 219. The computing device 120, 220 receives incoming messaging received at the wireless communication chip 119, 219 via wireless signaling protocol 300. The computing device 120, 220 further sends commands and information to the wireless communications chip 119, 219 to be sent via wireless signaling 300 to other devices.

A memory device 121, 221 coupled to the inside 113, 213 of the gem 110, 210. The memory device 121, 221 being electrically coupled to the battery 116, 216 and communicatively coupled to the computing device 120, 220 for storing data and retrieving of stored data.

Figure 4A:
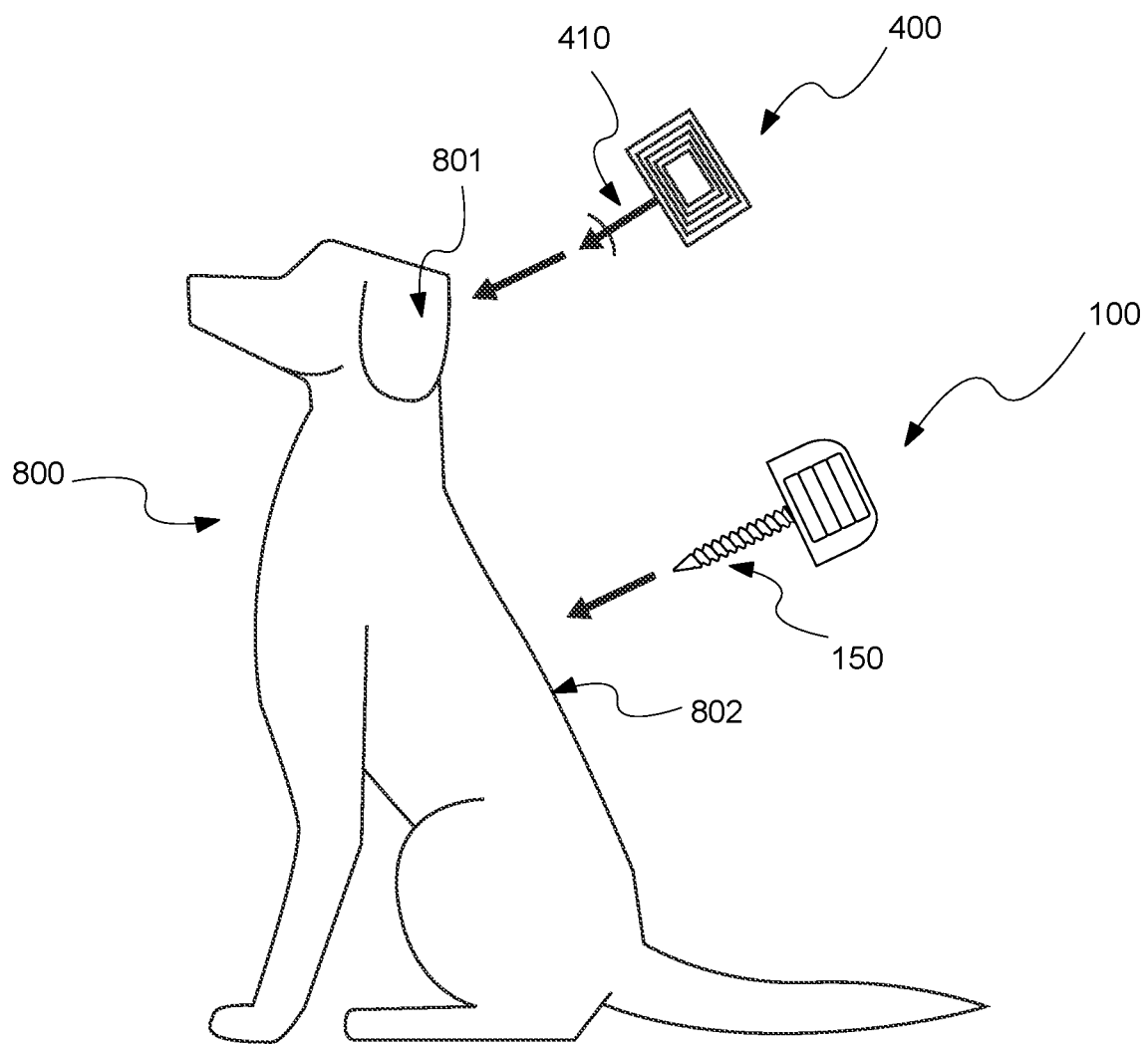
FIG. 4A and FIG. 4B are illustrated view of uses of the exemplary pet location device shown in FIG. 1A and second embodiment of the pet location device shown in FIG. 1B.
Figure 4B:
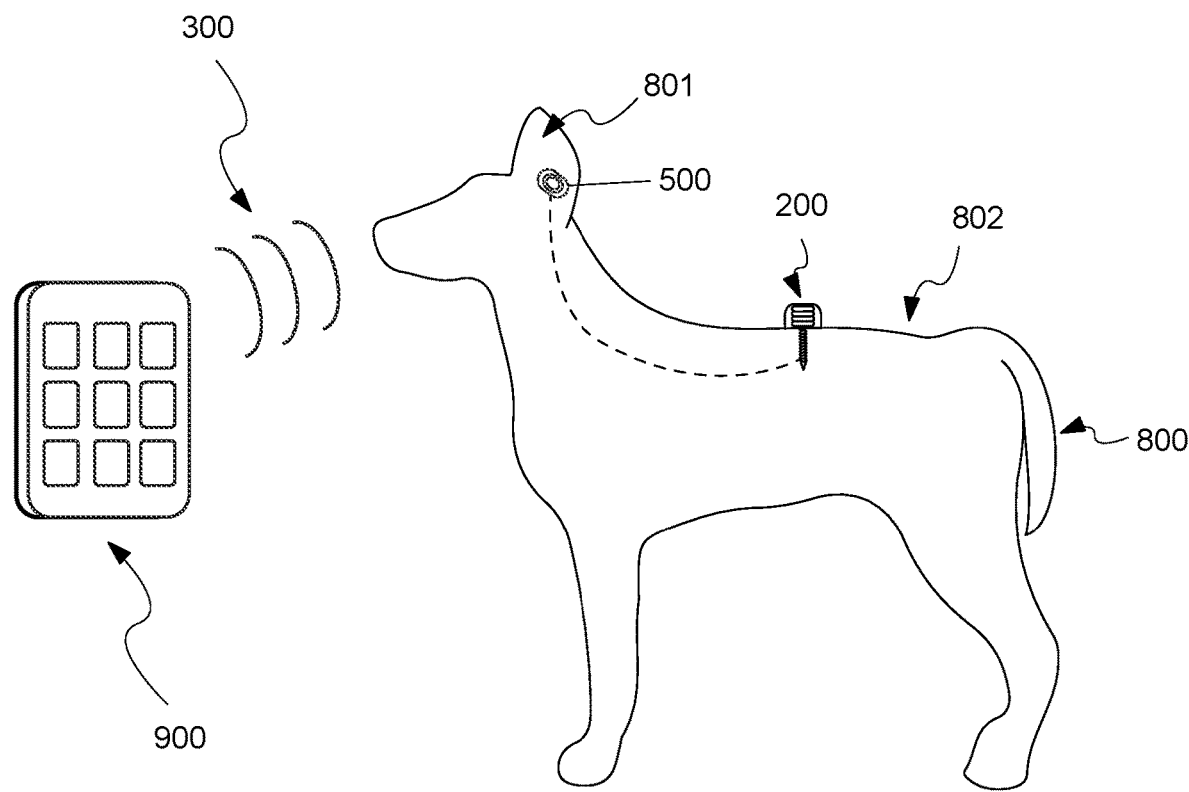

The incoming messages received by the computing device 120, 220 may include commands from an exterior device such as the smart phone 900 shown in FIG. 4B. The computing device 120, 220 determines what the request in the message is and calculates any information to be sent to the external device 900.

Furthermore, the computing device 120, 220 receives the GPS coordinate information from the GPS chip 118, 218 and calculates the location of the pet, such as the dog 800 shown in FIGS. 4A and 4B. The computing device 120, 220 may have other information or calculations that are necessary to send to the external device 900. The pet location device 100, 200 is preferably placed in a back 802 of a pet 800 (shown in FIG. 4B) by a Veterinarian.

Figure 3A:
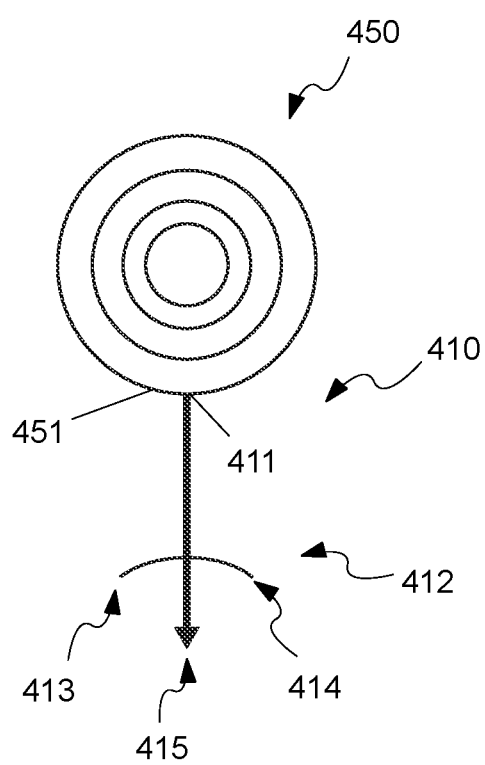
FIG. 3A and FIG. 3B are illustrated views of exemplary antennas.
Figure 3B:
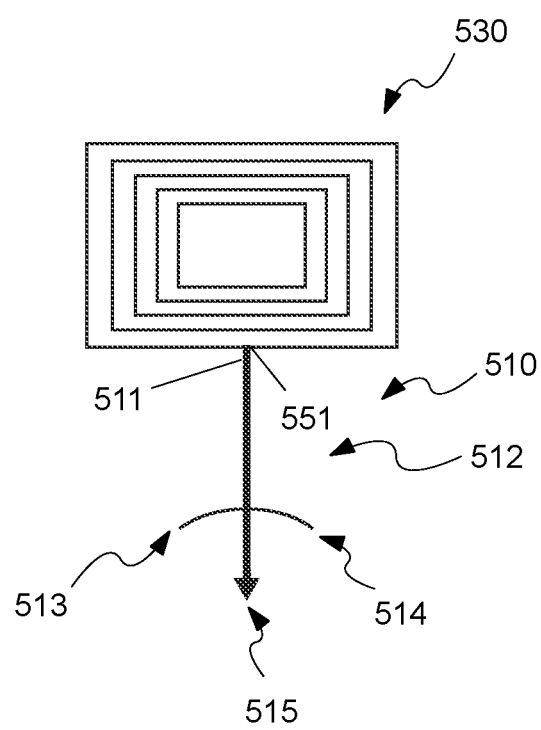

Referring now to FIGS. 3A and 3B, illustrated views of a first and a second antennae 400, 500 is presented.

Each of a first and a second antennae 400, 500 have a connector 410, 510 and a surface 450, 550. The surface 450,550 is substantially concave, so as to create a larger area for receiving wireless signaling 300 of FIG. 4B. The antennae 400, 500 is securely and communicative coupled to the wireless communication chip 119, 219. The antennae 400, 500 broadcast and receives wireless signaling 300 (see FIG. 4B) and the received wireless signaling 300 is communicated to the computing device 120, 220 through the wireless communication chip 119, 219.

A top 411, 511 of the connector 410, 510 is securely coupled to a bottom 451, 551 of the surface 450, 550. The bottom 412, 512 of the connector 410, 510 has a first end 413, 513, a second end 414, 514 and a middle stake 415, 515. The middle stake 415, 515 is inserted into an ear 801 of a pet 800 (shown in FIG. 4B). The antennae 400, 500 preferably appears as an earring in the ear 801 of the pet 800.

In FIG. 4A and FIG. 4B, an illustrated view of the pet location device 100, 200 are presented.

A pet 800 is preferably a dog, however, other types of pets are hereby contemplated, including, but not limited to, cats, cows, rabbits, etc. Although, this application is directed towards pets, it is hereby contemplated that it can be used on others such as the handicapped or elderly. Instead of the connector 150, 250 of the pet location device 100, 200, the connector may be an earring connector, or other typical type of connectors to a person.

In FIG. 4A, the pet 800 is sitting. The pet location device 100 is positioned to have the connector 150 of the pet location device 100 inserted into the back 802 of the pet 800 preferably by a veterinarian. The pet location device 100 is substantially flat such that it does intrude upon the pet 800. The antennae 400 is positioned to have the connector 410 of the antennae 400 inserted securely into the ear 801 of the pet 800. The antennae 400 is configured to present an earring in the ear of the pet.

FIG. 4B shows the pet 800 after the antennae 500 and the pet location device 200 have been coupled to the pet 800 by a veterinarian. The antennae 500 and the pet location device 200 have a flat, inconspicuous appearance.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A pet location device for tracking lost or stolen pets, the device comprising:
    a first connector, the first connector having a top and a bottom, the top of the first connector being flat;
    a gem, the gem having a top, a bottom and an inside;
    a solar panel, the solar panel being coupled to the top of the gem;
    a battery, the battery coupled to the inside of the gem and further coupled to the solar panel;
    a Global Positioning System (GPS) chip, the GPS chip being coupled to the inside of the gem, the GPS chip being commutatively coupled to GPS satellites, the GPS chip being electrically coupled to the battery;
    a wireless communication chip, the wireless communication chip being coupled to the inside of the gem, the wireless communication chip being electrically coupled to the battery, the wireless communication chip having a wireless signaling;
    a computing device, the computing device coupled to the inside of the gem, the computing device being electrically coupled to the battery, the computing device being communicatively coupled to GPS chip, the computing device being communicatively coupled to the wireless communication chip;
    a memory device, the memory device being coupled to the inside of the gem, the memory device being communicatively coupled to the computing device, the memory device being electrically coupled to the battery; and
    an antenna, the antennae having a surface and the first connector, a top of the connector being coupled to a bottom of the surface, the bottom of the connector have a first end, a second end and a middle stake, wherein the middle stake being removably coupled to an ear of a pet.

2. The device of claim 1, wherein the gem being made of a shatterproof plastic material.

3. The device of claim 1, wherein the bottom of the first connector being a point.

4. The device of claim 1, wherein the first connector being a screw.

5. The device of claim 1, wherein the first connector being made of a titanium material.

6. The device of claim 1, wherein the middle stake of the connector of the antennae having a point.

7. The device of claim 1, wherein antennae being communicatively coupled to the wireless communication chip.

8. The device of claim 1, wherein the surface of the antennae being a concave shape.

9. The device of claim 1, wherein the pet being a dog.

10. The device of claim 1, wherein the device being inserted into the pet by a veterinarian.

* * * * *